United States Patent
Liu (10) Patent No.: US 11,520,194 B2
(45) Date of Patent: Dec. 6, 2022

(54) LIQUID CRYSTAL DISPLAY PANEL AND DISPLAY DEVICE

(71) Applicant: WUHAN CHINA STAR OPTOELECTRONICS TECHNOLOGY CO., LTD., Hubei (CN)

(72) Inventor: Minggang Liu, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 653 days.

(21) Appl. No.: 16/464,581

(22) PCT Filed: Mar. 11, 2019

(86) PCT No.: PCT/CN2019/077593
§ 371 (c)(1),
(2) Date: May 28, 2019

(87) PCT Pub. No.: WO2020/107743
PCT Pub. Date: Jun. 4, 2020

(65) Prior Publication Data
US 2020/0326578 A1 Oct. 15, 2020

(30) Foreign Application Priority Data
Nov. 29, 2018 (CN) .......................... 201811443046.5

(51) Int. Cl.
*G02F 1/1345* (2006.01)
*G02F 1/1335* (2006.01)
(Continued)

(52) U.S. Cl.
CPC ...... *G02F 1/13458* (2013.01); *G02F 1/13394* (2013.01); *G02F 1/133512* (2013.01);
(Continued)

(58) Field of Classification Search
CPC ............... G02F 1/1339; G02F 1/13392; G02F 1/136209; G02F 1/13458
See application file for complete search history.

(56) References Cited

U.S. PATENT DOCUMENTS

2007/0291203 A1  12/2007  Nakahara et al.
2010/0134745 A1*  6/2010  Lee ..................... G02F 1/13458
349/190
(Continued)

FOREIGN PATENT DOCUMENTS

CN   102591072 A    7/2012
CN   102830564 A   12/2012
(Continued)

*Primary Examiner* — Jessica M Merlin
(74) *Attorney, Agent, or Firm* — PV IP PC; Wei Te Chung; Ude Lu (57) ABSTRACT

The present disclosure provides a liquid crystal display panel and a display device. The liquid crystal display panel includes an upper substrate and a lower substrate disposed opposite to the upper substrate. The lower substrate includes a non-display area having a connection terminal disposed therein. The connection terminal has an elongated stripe shape. By replacing the connection terminal having a square shape or a square-like shape with a connection terminal having an elongated stripe shape, light-reflection problems caused by metal having a large area in a local region are mitigated. Therefore, the technical problem that user experiences of using display devices are unsatisfactory because of light-reflection issues caused by conventional connection terminal is solved.

10 Claims, 4 Drawing Sheets

(51) Int. Cl.
*G02F 1/1339* (2006.01)
*G02F 1/1362* (2006.01)

(52) U.S. Cl.
CPC .. *G02F 1/133514* (2013.01); *G02F 1/136209* (2013.01); *G02F 1/136222* (2021.01)

(56) References Cited

U.S. PATENT DOCUMENTS

| | | | |
|---|---|---|---|
| 2011/0090445 A1* | 4/2011 | Kim | G02F 1/1339 |
| | | | 349/139 |
| 2013/0215366 A1 | 8/2013 | Chen | |
| 2014/0176884 A1 | 6/2014 | Yang et al. | |
| 2017/0053949 A1* | 2/2017 | Shin | G02F 1/1339 |
| 2017/0059923 A1 | 3/2017 | Ye | |
| 2017/0102578 A1 | 4/2017 | Shin et al. | |
| 2018/0307071 A1 | 10/2018 | Chen | |

FOREIGN PATENT DOCUMENTS

| | | | |
|---|---|---|---|
| CN | 103901669 A | 7/2014 |
| CN | 105068294 A | 11/2015 |
| CN | 106468836 A | 3/2017 |
| CN | 106647076 A | 5/2017 |
| CN | 106990594 A | 7/2017 |
| CN | 108153013 A | 6/2018 |
| CN | 108254977 A | 7/2018 |
| CN | 109407423 A | 3/2019 |
| JP | 2009294447 A | 12/2009 |

\* cited by examiner

LIQUID CRYSTAL DISPLAY PANEL AND DISPLAY DEVICE

FIELD OF INVENTION

The present disclosure relates to a field of liquid crystal display technology, and more particularly, to a liquid crystal display panel and a display device.

BACKGROUND

For liquid crystal cells of conventional display devices that employ a black matrix on array (BOA) technique or black photo spacer (BPS) technique, a black matrix (BM) or a BPS is formed on a thin film transistor array substrate (i.e., a lower substrate mentioned in the following description). In addition, in a non-display area where gold balls (Au balls) are configured to connect a first metal layer of the thin film transistor array substrate to a common electrode layer of a color filter substrate (i.e., an upper substrate mentioned in the following description), the BPS, and a passivation (PV) layer or a polymer film on array (PFA) have to be removed to expose the first metal layer and make the first metal layer function as a connection terminal. With the connection terminal, the first metal layer of the thin film transistor array substrate and the common electrode layer of the color filter substrate are connected to each via gold balls.

Figure 1:
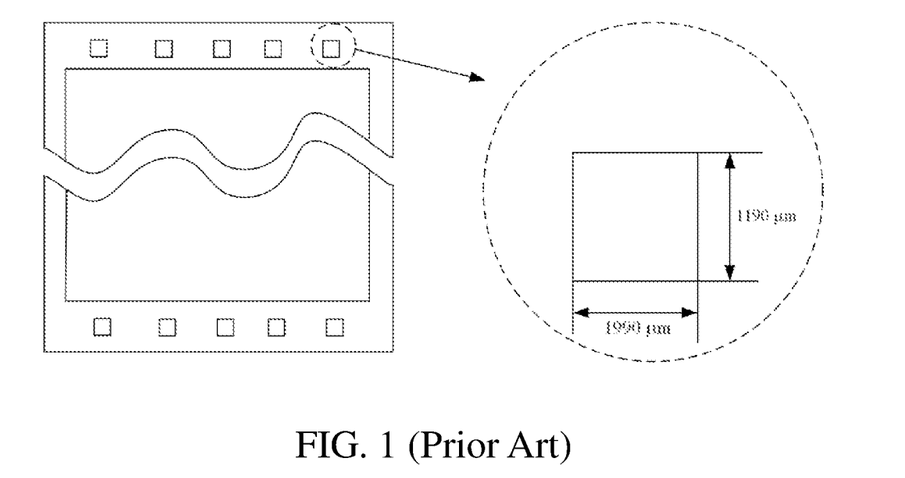
FIG. 1 shows an enlarged view of a connection terminal in a display device according to prior art.

However, the connection terminal formed in the conventional display devices has a square shape or a square-like shape. For example, as shown in FIG. 1, the connection terminal has a square-like shape of 1190 μm*1990 μm. Thus, if the first metal layer that constitutes the connection terminal is mesh-shaped, an area of the display device that corresponds to this region will cause light-leaking issues. On the other hand, if the first metal layer is formed to have a whole plane made of metal, an area of the display device that corresponds to this region will cause light-reflection issues. Therefore, user experiences of using the display devices are unsatisfactory.

That is, conventional display devices have technical problems that user experiences of using the display devices are unsatisfactory because the connection terminal in the conventional display devices causes light-reflection issues.

SUMMARY OF DISCLOSURE

The present disclosure provides a liquid crystal display panel and a display device in order to solve problems existing in prior art, where connection terminal in conventional display device causes light-reflection issues.

To solve the above-said problems, the present disclosure provides the technical schemes below.

The present disclosure provides a liquid crystal display panel, comprising:
an upper substrate; and
a lower substrate disposed opposite to the upper substrate, wherein the lower substrate includes a display area overlapping with the upper substrate and a non-display area having a connection terminal disposed therein, a space between the connection terminal and a common electrode layer of the upper substrate is filled with an electrically conductive material, a first metal layer of the lower substrate is electrically connected to the common electrode layer of the upper substrate via the connection terminal and the electrically conductive material;
wherein the connection terminal has an elongated stripe shape.

In the liquid crystal display panel of the present disclosure, a width of the connection terminal is not greater than 200 μm, and a length of the connection terminal is not less than 5000 μm.

In the liquid crystal display panel of the present disclosure, the connection terminal is constituted by the first metal layer of the lower substrate, where the first metal layer is exposed.

In the liquid crystal display panel of the present disclosure, the connection terminal is constituted by an auxiliary conductive layer disposed on a light-shielding layer of the lower substrate, and the auxiliary conductive layer is electrically connected to the first metal layer via a through-hole passing through the light-shielding layer and a planarization layer of the lower substrate.

In the liquid crystal display panel of the present disclosure, the connection terminal is constituted by an electrically conductive electrode layer of the lower substrate, where the electrically conductive electrode layer is exposed, the electrically conductive electrode layer is electrically connected to the first metal layer via a through-hole, and a photoresist layer is disposed between the connection terminal and the first metal layer.

In the liquid crystal display panel of the present disclosure, the photoresist layer comprises at least a first photoresist layer and a second photoresist layer stacked on each other, and the first photoresist layer and the second photoresist layer block light having different colors.

In the liquid crystal display panel of the present disclosure, the first photoresist layer is selected from one of a red color resist block, a green color resist block, and a blue color resist block, and the second photoresist layer is selected from one of the red color resist block, the green color resist block, and the blue color resist block, and is different from the first photoresist layer.

In the liquid crystal display panel of the present disclosure, the photoresist layer extends between a light-shielding layer of the lower substrate and the first metal layer.

In the liquid crystal display panel of the present disclosure, the electrically conductive electrode layer includes an extension portion positioned between a light-shielding layer of the lower substrate and a planarization layer of the lower substrate, and the extension portion is electrically connected to the first metal layer via the through-hole passing through the planarization layer of the lower substrate.

In the liquid crystal display panel of the present disclosure, the liquid crystal display panel further comprises a spacer element and a sealant glue disposed between the upper substrate and the lower substrate, the spacer element is disposed around the electrically conductive material, and the sealant glue surrounds the spacer element and the electrically conductive material.

In addition, the present disclosure provides a display device including a liquid crystal display panel, the liquid crystal display panel comprising:
an upper substrate; and
a lower substrate disposed opposite to the upper substrate, wherein the lower substrate includes a display area overlapping with the upper substrate and a non-display area having a connection terminal disposed therein, a space between the connection terminal and a common electrode layer of the upper substrate is filled with an electrically conductive material, a first metal layer of the lower substrate is electrically connected to the common electrode layer of the upper substrate via the connection terminal and the electrically conductive material;

wherein the connection terminal has an elongated stripe shape.

In the display device of the present disclosure, a width of the connection terminal is not greater than 200 μm, and a length of the connection terminal is not less than 5000 μm.

In the display device of the present disclosure, the connection terminal is constituted by the first metal layer of the lower substrate, where the first metal layer is exposed.

In the display device of the present disclosure, the connection terminal is constituted by an auxiliary conductive layer disposed on a light-shielding layer of the lower substrate, and the auxiliary conductive layer is electrically connected to the first metal layer via a through-hole passing through the light-shielding layer and a planarization layer of the lower substrate.

In the display device of the present disclosure, the connection terminal is constituted by an electrically conductive electrode layer of the lower substrate, where the electrically conductive electrode layer is exposed, the electrically conductive electrode layer is electrically connected to the first metal layer via a through-hole, and a photoresist layer is disposed between the connection terminal and the first metal layer.

In the display device of the present disclosure, the photoresist layer comprises at least a first photoresist layer and a second photoresist layer stacked on each other, and the first photoresist layer and the second photoresist layer block light having different colors.

In the display device of the present disclosure, the first photoresist layer is selected from one of a red color resist block, a green color resist block, and a blue color resist block, and the second photoresist layer is selected from one of the red color resist block, the green color resist block, and the blue color resist block, and is different from the first photoresist layer.

In the display device of the present disclosure, the photoresist layer extends between a light-shielding layer of the lower substrate and the first metal layer.

In the display device of the present disclosure, the electrically conductive electrode layer includes an extension portion positioned between a light-shielding layer of the lower substrate and a planarization layer of the lower substrate, and the extension portion is electrically connected to the first metal layer via the through-hole passing through the planarization layer of the lower substrate.

In the display device of the present disclosure, the liquid crystal display panel further comprises a spacer element and a sealant glue disposed between the upper substrate and the lower substrate, the spacer element is disposed around the electrically conductive material, and the sealant glue surrounds the spacer element and the electrically conductive material.

The present disclosure provides advantageous effects, as described below. The present disclosure provides a liquid crystal display panel and a display device. The liquid crystal display panel includes an upper substrate and a lower substrate disposed opposite to each other. The lower substrate includes a non-display area having a connection terminal disposed therein. The connection terminal has an elongated stripe shape. By replacing the connection terminal having a square shape or a square-like shape with a connection terminal having an elongated stripe shape, light-reflection issues caused by metal having large area in local region is mitigated. As such, sensation felt by human eyes is not obvious. Therefore, the technical problem that user experiences of using display devices are unsatisfactory because of light-reflection issues caused by connection terminal in conventional display device, is solved.

BRIEF DESCRIPTION OF DRAWINGS

To detailedly explain the technical schemes of the embodiments or existing techniques, drawings that are used to illustrate the embodiments or existing techniques are provided. Apparently, the illustrated embodiments are just a part of those of the present disclosure. It is easy for any person having ordinary skill in the art to obtain other drawings without labor for inventiveness.

DETAILED DESCRIPTION

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

Figure 2:
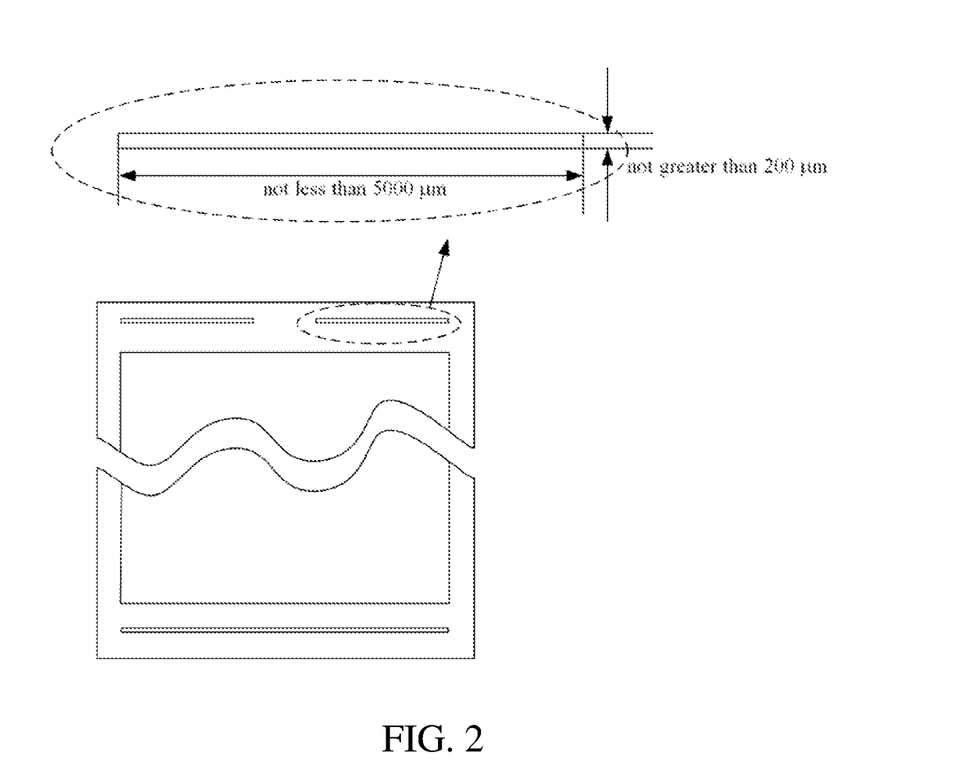
FIG. 2 shows an enlarged view of a connection terminal in a display device according to one embodiment of the present disclosure.

To solve the problem that user experiences of using display devices are unsatisfactory because of light-reflection issues caused by connection terminal in conventional display devices, as shown in FIG. 1, the present disclosure is characterized by replacing the connection terminal having a square shape or a square-like shape with a connection terminal having an elongated stripe shape, as shown in FIG. 2.

Figure 3:
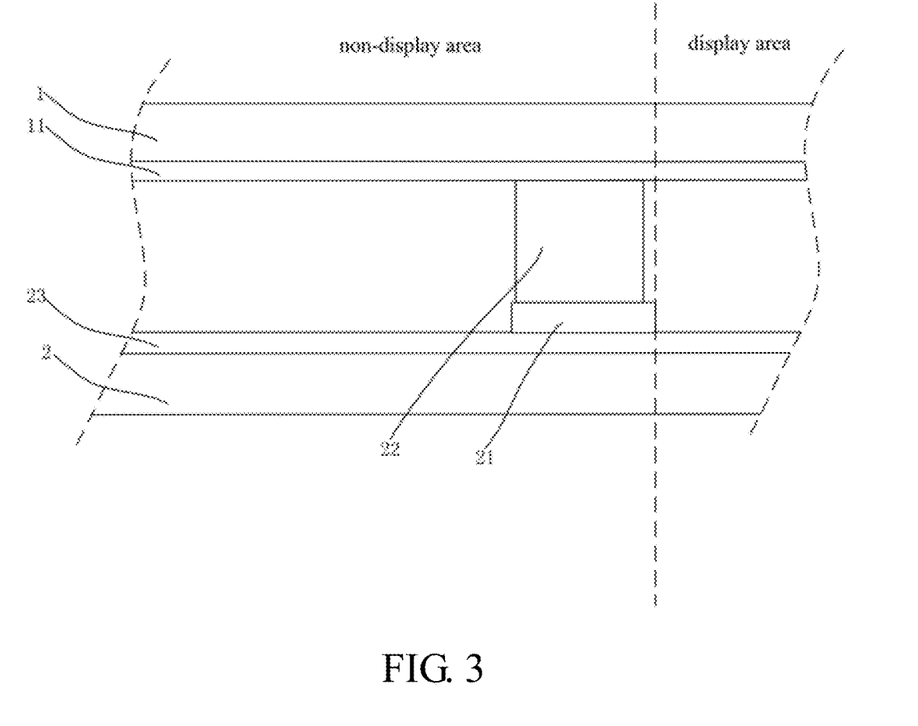
FIG. 3 shows a first structure of a liquid crystal display panel according to one embodiment of the present disclosure.

In one embodiment, as shown in FIG. 3, the present disclosure provides a liquid crystal display panel, including:

an upper substrate 1; and a lower substrate (e.g., a thin film transistor array substrate) 2 disposed opposite to the upper substrate 1, wherein the lower substrate 2 includes a display area overlapping with the upper substrate and a non-display area having a connection terminal 21 disposed therein, a space between the connection terminal 21 and a common electrode layer 11 of the upper substrate 1 is filled with an electrically conductive material 22, a first metal layer 23 of the lower substrate 2 is electrically connected to the common electrode layer 11 of the upper substrate 1 via the connection terminal 21 and the electrically conductive material 22;

wherein the connection terminal 21 has an elongated stripe shape.

In one embodiment, the liquid crystal display panel further includes a spacer element (such as a supporting wall) and a sealant glue disposed between the upper substrate 1 and the lower substrate 2. The spacer element is disposed around the electrically conductive material. The sealant glue surrounds the spacer element and the electrically conductive material, therefore a sealing component is formed.

In one embodiment, as shown in FIG. 2, a width of the connection terminal 21 is not greater than 200 μm, and a length of the connection terminal is not less than 5000 μm.

In one embodiment, as shown in FIG. 2, to ensure electrical conductivity between the upper substrate and the lower substrate, a contact area between the connection terminal and the electrically conductive material (such as Au balls) has to be greater than a specific value. For this reason, the length of the connection terminal is not less than 5000 μm.

In one embodiment, all of the connection terminals having an elongated stripe shape extend along an entire side, and thus look like that they are continuous. Thus, the connection terminals are unlike the metal blocks included in conventional display devices where the metal blocks reflect light. Because the upside of the display device includes chip on film (COF) bonding wiring, all the connection terminals thereon cannot be arranged to constitute a single continuous stripe. Instead, a plurality of elongated strips are used to avoid overlapping with fanout wiring. In contrast, for the downside of the display device, a single continuous elongated stripe can be used.

In one embodiment, the connection terminal is constituted by an electrically conductive electrode layer of the lower substrate, where the electrically conductive electrode layer is exposed. The electrically conductive electrode layer is electrically connected to the first metal layer via a through-hole. A photoresist layer is disposed between the connection terminal and the first metal layer. Detailed description thereof will be provided below with reference to FIG. 5.

In one embodiment, the photoresist layer includes at least a first photoresist layer and a second photoresist layer stacked on each other. The first photoresist layer and the second photoresist layer are configured to block light having different colors.

In one embodiment, the first photoresist layer is selected from one of a red color resist block, a green color resist block, and a blue color resist block. In addition, the second photoresist layer is selected from one of the red color resist block, the green color resist block, and the blue color resist block, and is different from the first photoresist layer.

In one embodiment, the photoresist layer extends between a light-shielding layer of the lower substrate and the first metal layer.

In one embodiment, the electrically conductive electrode layer includes an extension portion positioned between a light-shielding layer of the lower substrate and a planarization layer of the lower substrate. The extension portion is electrically connected to the first metal layer via the through-hole passing through the planarization layer of the lower substrate.

In one embodiment, the connection terminal is constituted by the first metal layer of the lower substrate, where the first metal layer is exposed. Detailed description thereof will be provided below with reference to FIG. 6.

In one embodiment, the connection terminal is constituted by an auxiliary conductive layer disposed on a light-shielding layer of the lower substrate. The auxiliary conductive layer is electrically connected to the first metal layer via a through-hole passing through the light-shielding layer and a planarization layer of the lower substrate. To achieve such a design, the through-hole has to be formed first by forming a hole in the region where the connection terminal is formed. The hole passes through the light-shielding layer and the planarization layer of the lower substrate. Then, the auxiliary conductive layer, such as a conductive indium tin oxide (ITO) layer, is formed on the light-shielding layer to function as a connection terminal. Since it is not difficult to realize such a design, detailed description thereof is omitted.

The following description will use a thin film transistor liquid crystal display panel as an example of the liquid crystal display panel to provide better understanding of the subject invention.

As mentioned above, the connection terminal is constituted by the electrically conductive layer in a transfer area. The description thereof will be omitted.

Figure 4:
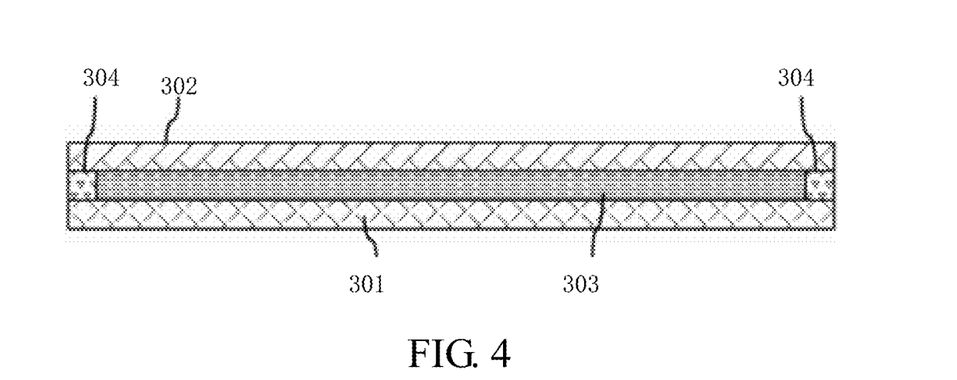
FIG. 4 shows a second structure of a liquid crystal display panel according to one embodiment of the present disclosure.

As shown in FIG. 4, the subject invention could be used in a thin film transistor liquid crystal display (TFT-LCD) panel. The liquid crystal display panel of the present disclosure includes a color filter substrate (i.e., the upper substrate mentioned above) 302, a thin film transistor array substrate (i.e., the lower substrate mentioned above) 301, a liquid crystal layer 303, and a sealing component 304. The liquid crystal layer 303 is sandwiched between the color filter substrate 302 and the thin film transistor array substrate 301.

The display device includes a display area and an outer periphery area (i.e., the non-display area mentioned above). The outer periphery area is disposed at at least one side of the display area.

A portion of the display device corresponding to the outer periphery area includes the sealing component 304, a second outer periphery area portion of the color filter substrate 302 of the display device, and a first outer periphery area portion of the thin film transistor array substrate 301 of the display device.

Figure 5:
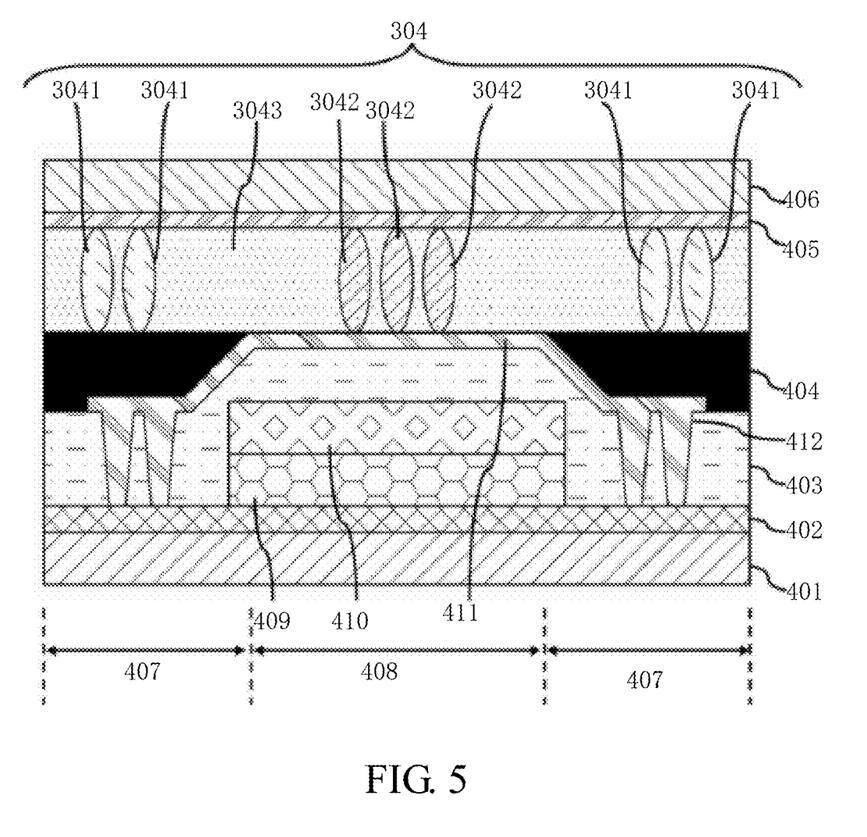
FIG. 5 shows a cross-sectional view of a first structure in a transfer area of a liquid crystal display panel according to one embodiment of the present disclosure.
Figure 6:
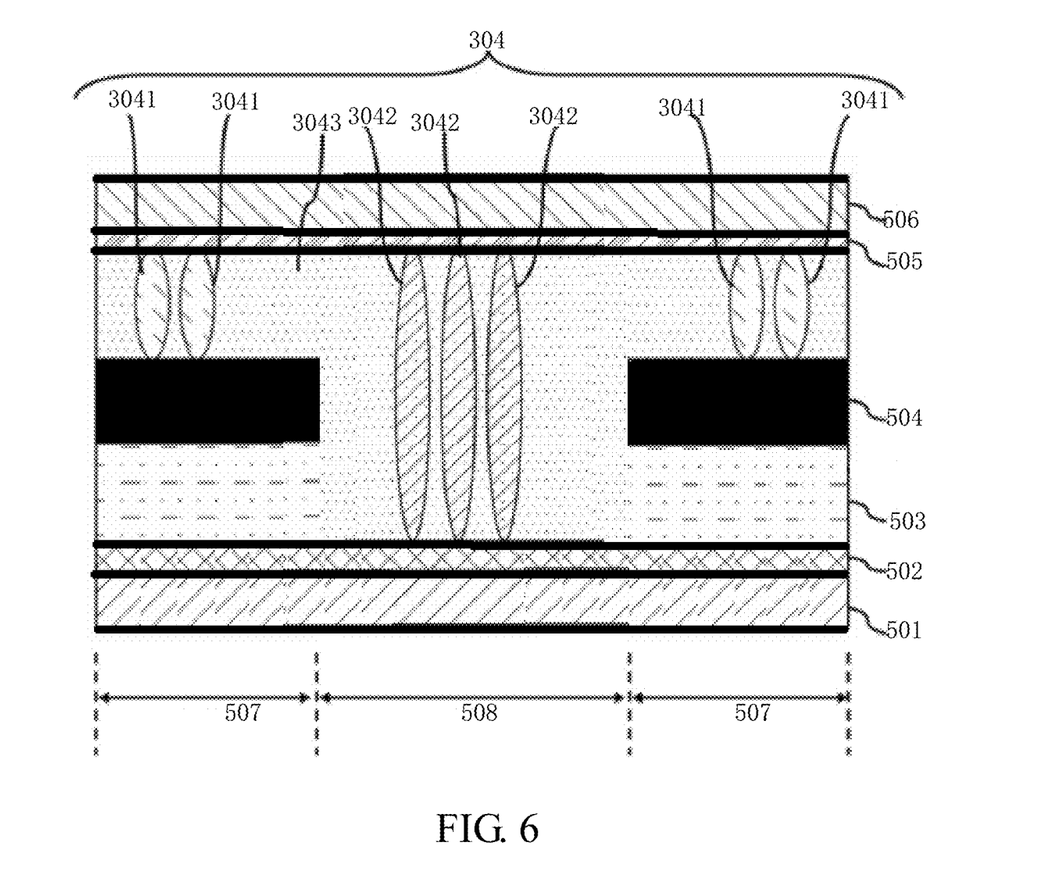
FIG. 6 shows a cross-sectional view of a second structure in a transfer area of a liquid crystal display panel according to one embodiment of the present disclosure.

As shown in FIG. 5 or FIG. 6, the sealing component 304 is disposed between the second outer periphery area portion and the first outer periphery area portion. The sealing component 304 includes a spacer element 3041, an electrically conductive element 3042, and a sealant glue 3043. The sealant glue 3043 surrounds the spacer element 3041 and the electrically conductive element (i.e., the electrically conductive material mentioned above, such as Au balls) 3042. The sealant glue 3043, in combination with the color filter substrate 302 and the thin film transistor array substrate 301, defines a sealed space that receives the liquid crystal layer 303.

In one embodiment, as shown in FIG. 5, the connection terminal is constituted by the electrically conductive electrode layer 411 in the transfer area, where the electrically conductive electrode layer 411 is exposed.

In the embodiment of FIG. 5, a first surface of a support platform that is used to support the spacer element 3041 in the first outer periphery area portion and a second surface of a conductive platform that is used to provide electricity to the common electrode layer 405 of the color filter substrate 302 via the electrically conductive element 3042 in the first outer periphery area portion are coplanar or generally coplanar.

Both the support platform and the conductive platform are disposed on a first substrate 401 in the first outer periphery area portion. The first outer periphery area portion includes a support area 407 and a transfer area 408. The support area 407 adjoins the transfer area 408. The support platform is composed of a portion of a first metal layer 402 in the support area 407, a portion of the planarization layer 403 in the support area 407, a portion of the electrically conductive electrode layer 411 in the support area 407, and a portion of the light-shielding layer 404 in the support area 407. The conductive platform is composed of a portion of the first metal layer 402 in the transfer area 408, a first color resist block (i.e., the first photoresist layer mentioned above) 409, a second color resist block (i.e., the second photoresist layer mentioned above) 410, a portion of the planarization layer 403 in the transfer area 408, and a portion of the electrically conductive electrode layer 411 in the transfer area 408.

The first color resist block 409 is selected from one of a red color resist block, a green color resist block, and a blue color resist block. The second color resist block 410 is selected from one of the red color resist block, the green color resist block, and the blue color resist block, and is different from the first color resist block 409.

The first color resist block 409 is stacked with the second color resist block 410 to form an integral body (i.e., the photoresist layer mentioned above) that extends between the light-shielding layer 404 and the first metal layer 402 to entirely cover the transfer area 408 and partially extend to the support area 407, and is configured to block light from being leaked in the transfer area 408 towards outside of the display device or to prevent light from being reflected in the transfer area 408 of the display device.

The transfer area 408 is the region where light is leaked in the outer periphery area of the display device. The first color resist block 409 is stacked with the second color resist block 410 to form an integral body that covers the transfer area 408.

The first metal layer 402 is disposed to correspond to an electrically conductive pad in the outer periphery area of the display device.

The electrically conductive element 3042 is made of an electrically conductive material, such as copper. The spacer element 3041 is made of an insulation material.

The spacer element 3041 is any one of a sphere, a spheroid, and a polyhedron.

The electrically conductive element 3042 is any one of a sphere, a spheroid, and a polyhedron.

The spacer element 3041 and the electrically conductive element 3042 are mixed in the sealant glue 3043, and are disposed together with the sealant glue 3043 at same time between the second outer periphery area portion and the first outer periphery area portion.

The spacer element 3041 is used to maintain a predetermined interval between the second outer periphery area portion and the first outer periphery area portion.

Similarly, the electrically conductive element 3042 is also used to maintain the predetermined interval between the second outer periphery area portion and the first outer periphery area portion.

The electrically conductive element 3042 is used to electrically connect the electrically conductive electrode layer 411 in the first outer periphery area portion to the common electrode layer 405 in the second outer periphery area portion. The electrically conductive electrode layer 411 is used to provide electricity to the common electrode layer 405 via the electrically conductive element 3042.

A height of the spacer element 3041 in a direction, which is vertical to a plane where the display device is disposed, is identical to or generally identical to a height of the electrically conductive element 3042 in the direction.

The portion of the electrically conductive electrode layer 411 in the support area 407 is sandwiched between the portion of the planarization layer 403 in the support area 407 and the portion of the light-shielding layer 404 in the support area 407.

The electrically conductive electrode layer 411 in the support area 407 passes through a through-hole 412 in the portion of the planarization layer 403 in the support area 407, and is connected to the portion of the first metal layer 402 in the support area 407.

For the support platform, the portion of the first metal layer 402 in the support area 407 is disposed on the first substrate 401. The portion of the planarization layer 403 in the support area 407 is disposed on the portion of the first metal layer 402 in the support area 407. The portion of the electrically conductive electrode layer 411 in the support area 407 is disposed on the portion of the planarization layer 403 in the support area 407. At least a part of the portion of the light-shielding layer 404 in the support area 407 is disposed on the portion of electrically conductive electrode layer 411 in the support area 407.

For the conductive platform, the portion of the first metal layer 402 in the transfer area 408 is disposed on the first substrate 401. The first color resist block 409 is disposed on the portion of the first metal layer 402 in the transfer area 408. The second color resist block 410 is disposed on the first color resist block 409. The portion of the planarization layer 403 in the transfer area 408 is disposed on the second color resist block 410. The portion of the electrically conductive electrode layer 411 in the transfer area 408 is disposed on the portion of the planarization layer 403 in the transfer area 408.

The portion of the electrically conductive electrode layer 411 in the transfer area 408 is bent at a location where the conductive platform adjoins the support platform, and is connected to the portion of the electrically conductive electrode layer 411 in the support area 407.

Both the spacer element 3041 and the electrically conductive element 3042 adjoin the second outer periphery area portion and the first outer periphery area portion.

The second outer periphery area portion of the color filter substrate 302 is composed of the second substrate 406 and the common electrode layer 405. The common electrode layer 405 is disposed on the second substrate 406.

The first outer periphery area portion of the thin film transistor array substrate 301 is composed of the first substrate 401, the support platform, and the conductive platform. Both the support platform and the conductive platform are disposed on the first substrate 401.

The transfer area 408 is located between two support areas 407.

The conductive platform is configure to raise a height of the second surface adjoining the spacer element 3041 and/or the conductive element 3042 in the transfer area 408 along a direction that is vertical to the plane where the display device is disposed, such that the second surface is coplanar with the first surface, and thus a distance between any location of the second surface and the second outer periphery area portion is identical to or generally identical to a distance between any location of the first surface and the second outer periphery area portion.

The above technical design is characterized in that the first color resist block and the second color resist block are included in the conductive platform in the transfer area, wherein the transfer area adjoins the support area where the support platform is disposed, and the electrically conductive electrode layer in the conductive platform can be disposed on the integral body formed by stacking the first color resist block and the second color resist block. Therefore, the portion of the first metal layer that corresponds to the transfer area will not cause light-leaking or light-reflection problems, thus preventing the light-leaking or light-reflection problems from occurring in the outer periphery area of the display device.

In addition, with such a technical design, the spacer element 3041 and the conductive element 3042 having the same size can be mixed in the sealant glue 3043, and can be disposed between the second outer periphery area portion and the first outer periphery area portion at same time. And, both the spacer element 3041 and the conductive element 3042 adjoin the second outer periphery area portion and the first outer periphery area portion. Therefore, there is no need to perform two processes in order to dispose the conductive element 3042 and the spacer element 3041 between the second outer periphery area portion and the first outer periphery area portion. Manufacturing time of display device is shortened.

The electrically conductive electrode layer 411 is made of a material that is the same as that of a pixel electrode in the display area of the thin film transistor array substrate 301, and both are formed in a same process.

The sealing component 304 is formed by disposing the sealant glue 3043, where the spacer element 3041 and the conductive element 3042 are mixed between the second outer periphery area portion and the first outer periphery area portion at a time, and then curing the sealant glue 3043.

Specifically, the technical scheme provided present disclosure is described below.

A stack of two different color resists (for example, RB, RG, or BG) is formed to block the region where light is leaked or reflected in the first outer periphery area portion. The planarization layer 403 and the electrically conductive electrode layer 411 (ITO) are formed on the integral body of the two color resists. The electrically conductive electrode layer 411 extends to the bottom of the portion of the light-shielding layer (e.g., a black photo spacer, BPS) 404 in the support area. The through-hole 412 is formed in the planarization layer 403 under the portion of the light-shielding layer 404 in the support area, wherein the through-hole 412 is used to make the electrically conductive electrode layer 411 connect to the first metal layer 402. Therefore, the common electrode layer 405 of the color filter substrate 402 is electrically connected to the first metal layer 402 of the thin film transistor array substrate 301 via the electrically conductive element 3042.

The technical design provided by the present disclosure can solve the light-leaking or light-reflection problems occurring at a location of a transfer pad in the display device employing a black matrix on array (BOA) technique or black photo spacer (BPS) technique.

In addition, according to the present disclosure, a surface of the conductive platform supporting the electrically conductive element 3042 and a surface of the support platform supporting the spacer element 3041 are coplanar or generally coplanar. Thus, both the spacer element 3041 and the conductive element 3042 adjoin the second outer periphery area portion and the first outer periphery area portion. Therefore, the spacer element 3041 and the conductive element (Au ball) 3042 can be disposed at same time between the second outer periphery area portion and the first outer periphery area portion. The manufacturing process of display device is simplified, and manufacturing time of display device is shortened.

In one embodiment, as shown in FIG. 6, the connection terminal is constituted by the first metal layer 502 in the transfer area, wherein the first metal layer 502 is exposed.

In the embodiment of FIG. 6, the first surface of the support platform that is used to support the spacer element 3041 in the first outer periphery area portion and the second surface of a conductive platform that is used to provide electricity to the common electrode layer 505 of the color filter substrate 302 via the electrically conductive element 3042 in the first outer periphery area portion are coplanar or generally coplanar.

Both the support platform and the conductive platform are disposed in the first outer periphery area portion on the first substrate 501. The first outer periphery area portion includes a support area 507 and a transfer area 508. The support area 507 adjoins the transfer area 508. The support platform is composed of a portion of the first metal layer 502 in the support area 507, a portion of the planarization layer 503 in the support area 507, and a portion of the light-shielding layer 504 in the support area 507. The conductive platform is composed of a portion of the first metal layer 502 in the transfer area 508.

The first metal layer 502 is disposed to correspond to an electrically conductive pad in the outer periphery area of the display device.

The electrically conductive element 3042 is used to electrically connect the first metal layer 502 in the first outer periphery area portion to the common electrode layer 505 in the second outer periphery area portion. The first metal layer 502 is used to provide electricity to the common electrode layer 505 via the electrically conductive element 3042.

For the support platform, the portion of the first metal layer 502 in the support area 507 is disposed on the first substrate 501. The portion of the planarization layer 503 in the support area 507 is disposed on the portion of the first metal layer 502 in the support area 507. The portion of the light-shielding layer 504 in the support area 507 is disposed on the portion of the planarization layer 503 in the support area 507.

For the conductive platform, the portion of the first metal layer 502 in the transfer area 508 is disposed on the first substrate 501.

The second outer periphery area portion of the color filter substrate 302 is composed of the second substrate 506 and the common electrode layer 505. The common electrode layer 505 is disposed on the second substrate 506.

The first outer periphery area portion of the thin film transistor array substrate 301 is composed of the first substrate 501, the support platform, and the conductive platform. Both the support platform and the conductive platform are disposed on the first substrate 501.

The transfer area 508 is located between two support areas 507.

In one embodiment, the present disclosure further provides a display device including a liquid crystal display panel. The liquid crystal display panel includes:

an upper substrate; and a lower substrate disposed opposite to the upper substrate, wherein the lower substrate includes a display area overlapping with the upper substrate and a non-display area having a connection terminal disposed therein, a space between the connection terminal and a common electrode layer of the upper substrate is filled with an electrically conductive material, a first metal layer of the lower substrate is electrically connected to the common electrode layer of the upper substrate via the connection terminal and the electrically conductive material;

wherein the connection terminal has an elongated stripe shape.

Based on this structure, light-reflection caused by metal having a large area in a local region of the display device is mitigated. Sensation felt by human eyes is not obvious. Therefore, the technical problem that user experiences of using display devices are unsatisfactory because of light-reflection issues caused by connection terminal in conventional display devices is solved.

In one embodiment, a width of the connection terminal is not greater than 200 μm, and a length of the connection terminal is not less than 5000 μm.

In one embodiment, the connection terminal is constituted by the first metal layer of the lower substrate, where the first metal layer is exposed.

In one embodiment, the connection terminal is constituted by an auxiliary conductive layer disposed on a light-shielding layer of the lower substrate, and the auxiliary conductive layer is electrically connected to the first metal layer via a through-hole passing through the light-shielding layer and a planarization layer of the lower substrate.

In one embodiment, the connection terminal is constituted by an electrically conductive electrode layer of the lower substrate, where the electrically conductive electrode layer is exposed, the electrically conductive electrode layer is electrically connected to the first metal layer via a through-hole, and a photoresist layer is disposed between the connection terminal and the first metal layer.

In one embodiment, the photoresist layer comprises at least a first photoresist layer and a second photoresist layer stacked on each other, and the first photoresist layer and the second photoresist layer block light having different colors.

In one embodiment, the first photoresist layer is selected from one of a red color resist block, a green color resist block, and a blue color resist block, and the second photoresist layer is selected from one of the red color resist block, the green color resist block, and the blue color resist block, and is different from the first photoresist layer.

In one embodiment, the photoresist layer extends between the light-shielding layer of the lower substrate and the first metal layer.

In one embodiment, the electrically conductive electrode layer includes an extension portion positioned between the light-shielding layer of the lower substrate and the planarization layer of the lower substrate, and the extension portion is electrically connected to the first metal layer via the through-hole passing through the planarization layer of the lower substrate.

In one embodiment, the liquid crystal display panel further comprises a spacer element and a sealant glue disposed between the upper substrate and the lower substrate, the spacer element is disposed around the electrically conductive material, and the sealant glue surrounds the spacer element and the electrically conductive material.

Accordingly, in view of the above embodiments, the present disclosure provides a liquid crystal display panel and a display device. The liquid crystal display panel includes an upper substrate and a lower substrate disposed opposite to each other. The lower substrate includes a non-display area having a connection terminal disposed therein. The connection terminal has an elongated stripe shape. By replacing the connection terminal having a square shape or a square-like shape with a connection terminal having an elongated stripe shape, light-reflection problems caused by metal having a large area in a local region are mitigated. As such, sensation felt by human eyes is not obvious. Therefore, the technical problem that user experiences of using display devices are unsatisfactory because of light-reflection issues caused by connection terminal in conventional display devices is solved.

While the present disclosure has been described with the aforementioned preferred embodiments, it is preferable that the above embodiments should not be construed as limiting of the present disclosure. Anyone having ordinary skill in the art can make a variety of modifications and variations without departing from the spirit and scope of the present disclosure as defined by the following claims.

What is claimed is:

1. A liquid crystal display panel, comprising:
an upper substrate provided with a common electrode layer;
a lower substrate disposed opposite to the upper substrate and comprising a display area and an outer periphery area, wherein the outer periphery area comprises two support areas and one transfer area located between the two support areas, the lower substrate is provided with two support platform respectively located in the two support areas and one conductive platform located in the transfer area, each of the support platforms sequentially comprises a portion of a metal layer, a portion of a planarization layer, a portion of an electrically conductive electrode layer, and a portion of a light-shielding layer in one corresponding support area, the conductive platform sequentially comprises a portion of the metal layer in the transfer area, a first color resist block, a second color resist block, a portion of the planarization layer in the transfer area, and a portion of the electrically conductive electrode layer in the transfer area, the portion of the electrically conductive electrode layer of the conductive platform is a connection terminal, a width of the connection terminal is not greater than 200 μm, a length of the connection terminal is not less than 5000 μm, a surface of the portion of the electrically conductive electrode layer of the conductive platform facing the upper substrate is coplanar with and adjacent to a surface of the portion of the light-shielding layer of each of the support platforms facing the upper substrate, and in each of the support platforms, the portion of the electrically conductive electrode layer is connected to the portion of the metal layer through a through-hole in the portion of the planarization layer;
a plurality of electrically conductive elements contacting the portion of the electrically conductive electrode layer of the conductive platform and the common electrode layer; and
a plurality of spacer elements contacting the portion of the light-shielding layer of each of the support platforms and the common electrode layer, wherein a height of the spacer elements in a direction perpendicular to the lower substrate is same as a height of the electrically conductive elements in the direction perpendicular to the lower substrate.

2. The liquid crystal display panel according to claim 1, wherein the first photoresist layer and the second photoresist layer block light have different colors.

3. The liquid crystal display panel according to claim 2, wherein the first photoresist layer is one of a red color resist block, a green color resist block, and a blue color resist block, and the second photoresist layer is another one of the red color resist block, the green color resist block, and the blue color resist block.

4. The liquid crystal display panel according to claim 1, wherein the first photoresist layer and the second photoresist layer extend between the portion of the light-shielding layer and the portion of the metal layer of each of the support platforms.

5. The liquid crystal display panel according to claim 1, further comprising:

a sealant glue disposed between the upper substrate and the lower substrate and surrounding the spacer elements and the electrically conductive elements.

6. A display device comprising a liquid crystal display panel, wherein the liquid crystal display panel comprises:

an upper substrate provided with a common electrode layer;

a lower substrate disposed opposite to the upper substrate and comprising a display area and an outer periphery area, wherein the outer periphery area comprises two support areas and one transfer area located between the two support areas, the lower substrate is provided with two support platform respectively located in the two support areas and one conductive platform located in the transfer area, each of the support platforms sequentially comprises a portion of a metal layer, a portion of a planarization layer, a portion of an electrically conductive electrode layer, and a portion of a light-shielding layer in one corresponding support area, the conductive platform sequentially comprises a portion of the metal layer in the transfer area, a first color resist block, a second color resist block, a portion of the planarization layer in the transfer area, and a portion of the electrically conductive electrode layer in the transfer area, the portion of the electrically conductive electrode layer of the conductive platform is a connection terminal, a width of the connection terminal is not greater than 200 μm, a length of the connection terminal is not less than 5000 μm, a surface of the portion of the electrically conductive electrode layer of the conductive platform facing the upper substrate is coplanar with and adjacent to a surface of the portion of the light-shielding layer of each of the support platforms facing the upper substrate, and in each of the support platforms, the portion of the electrically conductive electrode layer is connected to the portion of the metal layer through a through-hole in the portion of the planarization layer;

a plurality of electrically conductive elements contacting the portion of the electrically conductive electrode layer of the conductive platform and the common electrode layer; and a plurality of spacer elements contacting the portion of the light-shielding layer of each of the support platforms and the common electrode layer, wherein a height of the spacer elements in a direction perpendicular to the lower substrate is same as a height of the electrically conductive elements in the direction perpendicular to the lower substrate.

7. The display device according to claim 6, wherein the first photoresist layer and the second photoresist layer block light have different colors.

8. The display device according to claim 7, wherein the first photoresist layer is one of a red color resist block, a green color resist block, and a blue color resist block, and the second photoresist layer is another one of the red color resist block, the green color resist block, and the blue color resist block.

9. The display device according to claim 6, wherein the first photoresist layer and the second photoresist layer extend between the portion of the light-shielding layer and the portion of the metal layer of each of the support platforms.

10. The display device according to claim 6, wherein the liquid crystal display panel further comprises a sealant glue disposed between the upper substrate and the lower substrate and surrounds the spacer elements and the electrically conductive elements.

* * * * *